United States Patent
Su et al.

(10) Patent No.: US 9,360,727 B1
(45) Date of Patent: Jun. 7, 2016

(54) PIXEL STRUCTURE OF DISPLAY PANEL

(71) Applicant: AU Optronics Corp., Hsin-Chu (TW)

(72) Inventors: Chih-Chung Su, Hsin-Chu (TW); Yi-Wei Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 3 days.

(21) Appl. No.: 14/616,754

(22) Filed: Feb. 9, 2015

(30) Foreign Application Priority Data

Nov. 25, 2014 (TW) .............................. 103140833 A

(51) Int. Cl.
| | |
|---|---|
| *H01L 21/00* | (2006.01) |
| *G02F 1/1362* | (2006.01) |
| *G02F 1/1368* | (2006.01) |
| *G02F 1/1343* | (2006.01) |
| *G02F 1/1335* | (2006.01) |

(52) U.S. Cl.
CPC ........ *G02F 1/136286* (2013.01); *G02F 1/1368* (2013.01); *G02F 1/133512* (2013.01); *G02F 1/134309* (2013.01); *G02F 2001/134345* (2013.01)

(58) Field of Classification Search
CPC ................... G02F 1/133512; G02F 1/133514; G02F 1/13394; G02F 1/136227; G02F 1/136209; G02F 2201/501; G02F 1/1335; G02F 1/13338; G02F 1/1368; G02F 1/01; H01L 27/1259; H01L 27/1214; G06F 3/041; G06F 3/038; G06F 3/0412

USPC .................. 438/30–34; 257/59–72, E21.411, 257/E21.535, E29.273, E33.001, E33.053; 349/38, 43, 106, 110, 139, 144, 506

See application file for complete search history.

(56) References Cited

U.S. PATENT DOCUMENTS

| | | | |
|---|---|---|---|
| 5,515,187 A | 5/1996 | Nakamura | |
| 6,914,642 B2 | 7/2005 | Yamazaki | |
| 8,044,905 B2 | 10/2011 | Kasahara | |
| 2010/0225609 A1* | 9/2010 | Huang | ................ G02F 1/13338 345/173 |
| 2014/0104527 A1* | 4/2014 | Yang | .................... H01L 27/1225 349/43 |

* cited by examiner

*Primary Examiner* — Charles Garber
*Assistant Examiner* — Abdulfattah Mustapha
(74) *Attorney, Agent, or Firm* — Winston Hsu; Scott Margo

(57) ABSTRACT

A pixel structure of display panel includes a first thin film transistor device, a second thin film transistor device, a first passivation layer, a common electrode, a second passivation layer, a first pixel electrode and a second pixel electrode. The first passivation layer has a first opening partially exposing a first drain electrode of the first thin film transistor device and a second drain electrode of the second thin film transistor device. The common electrode has a second opening partially exposing the first drain electrode and the second drain electrode. The second passivation layer has a third opening partially exposing the first drain electrode and the second drain electrode. The first pixel electrode is electrically connected to the first drain electrode through the third opening, the second opening and the first opening, and the second pixel electrode is electrically connected to the second drain electrode through the third opening, the second opening and the first opening.

18 Claims, 8 Drawing Sheets

PIXEL STRUCTURE OF DISPLAY PANEL

BACKGROUND

1. Technical Field

The present disclosure relates to a pixel structure of display panel, and more particularly, to a pixel structure of display panel with high aperture ratio.

2. Description of the Prior Art

A display panel mainly includes an array substrate, a counter substrate and a display medium interposed between the array substrate and the counter substrate. On the array substrate, a plurality of components e.g. gate lines, data lines and thin film transistor (TFT) devices are disposed. In order to shield the gate lines, the data lines and the TFT devices and to avoid color mixing between adjacent sub-pixel regions, light-shielding patterns (normally referred to as black matrix, BM) are disposed on the counter substrate. The dimension of the light-shielding pattern, however, is not only limited due to process limit, but also the alignment bias between the array substrate and the counter substrate. Therefore, it is one of the main issues in display industries to reduce the dimension of the light-shielding pattern so as to increase the aperture ratio without influencing the light-shielding effect.

SUMMARY OF THE INVENTION

It is therefore one of the objectives of the present disclosure to provide a pixel structure of display panel with high aperture ratio.

According to one exemplary embodiment, a pixel structure of display panel is provided. The pixel structure of display panel includes a first substrate, a first gate line, a second gate line, a first thin film transistor device, a second thin film transistor device, a first passivation layer, a common electrode, a second passivation layer, a first pixel electrode and a second pixel electrode. The first substrate has a first sub-pixel region and a second sub-pixel region, and the first sub-pixel region and the second sub-pixel region are disposed adjoining in a first direction. The first gate line is disposed between the first sub-pixel region and the second sub-pixel region and extends along a second direction. The second gate line is disposed between the first sub-pixel region and the second sub-pixel region and extends along the second direction. The first thin film transistor device is disposed on the first substrate, where the first thin film transistor device comprises a first semiconductor channel layer, a first gate electrode, a first source electrode and a first drain electrode, the first gate electrode is electrically connected to the first gate line, the first gate electrode partially overlaps the first semiconductor channel layer, and the first source electrode and the first drain electrode are electrically connected to the first semiconductor channel layer respectively. The second thin film transistor device is disposed on the first substrate, where the second thin film transistor device comprises a second semiconductor channel layer, a second gate electrode, a second source electrode and a second drain electrode, the second gate electrode is electrically connected to the second gate line, the second gate electrode partially overlaps the second semiconductor channel layer, and the second source electrode and the second drain electrode are electrically connected to the second semiconductor channel layer respectively. The first passivation layer is disposed on the first thin film transistor device and the second thin film transistor device, where the first passivation layer has a first opening partially exposing the first drain electrode and the second drain electrode. The common electrode is disposed on the first passivation layer, where the common electrode has a second opening partially exposing the first drain electrode and the second drain electrode, and the second opening at least partially overlaps the first opening in a vertical projection direction. The second passivation layer is disposed on the first passivation layer and covers the common electrode, where the second passivation layer has a third opening partially exposing the first drain electrode and the second drain electrode, and the third opening at least partially overlaps the first opening and the second opening in the vertical projection direction. The first pixel electrode is disposed on the second passivation layer, where the first pixel electrode is electrically connected to the first drain electrode through the third opening, the second opening and the first opening. The second pixel electrode is disposed on the second passivation layer, where the second pixel electrode is electrically connected to the second drain electrode through the third opening, the second opening and the first opening.

According to another exemplary embodiment, a pixel structure of display panel is provided. The pixel structure of display panel includes a first substrate, a first gate line, a second gate line, a first thin film transistor device, a second thin film transistor device and a third thin film transistor device. The first substrate has a first sub-pixel region, a second sub-pixel region and a third sub-pixel region, where the first sub-pixel region and the second sub-pixel region are disposed adjoining in a first direction, and the first sub-pixel region and the third sub-pixel region are disposed adjoining in a second direction. The first gate line is disposed between the first sub-pixel region and the second sub-pixel region and extends along the second direction. The second gate line is disposed between the first sub-pixel region and the second sub-pixel region and extending along the second direction. The first thin film transistor device is disposed on the first substrate, where the first thin film transistor device comprises a first semiconductor channel layer, a first gate electrode, a first source electrode and a first drain electrode, the first gate electrode is electrically connected to the first gate line, the first gate partially overlaps the first semiconductor channel layer, and the first source electrode and the first drain electrode are electrically connected to the first semiconductor channel layer respectively. The second thin film transistor device is disposed on the first substrate, where the second thin film transistor device comprises a second semiconductor channel layer, a second gate electrode, a second source electrode and a second drain electrode, the second gate electrode is electrically connected to the second gate line, the second gate electrode partially overlaps the second semiconductor channel layer, and the second source electrode and the second drain electrode are electrically connected to the second semiconductor channel layer respectively. The third thin film transistor device is disposed on the first substrate, where the third thin film transistor device comprises a third semiconductor channel layer, a third gate electrode, a third source electrode and a third drain electrode, the third gate electrode is electrically connected to the first gate line, the third gate electrode partially overlaps the third semiconductor channel layer, and the third source electrode and the third drain electrode are electrically connected to the third semiconductor channel layer respectively. The first semiconductor channel layer and the second semiconductor channel layer are structurally connected to each other, or the second semiconductor channel layer and the third semiconductor channel layer are structurally connected to each other.

These and other objectives of the present disclosure will no doubt become obvious to those of ordinary skill in the art after

DETAILED DESCRIPTION

To provide a better understanding of the present disclosure, preferred embodiments will be made in detail. The preferred embodiments of the present disclosure are illustrated in the accompanying drawings with numbered elements.

Figure 1:
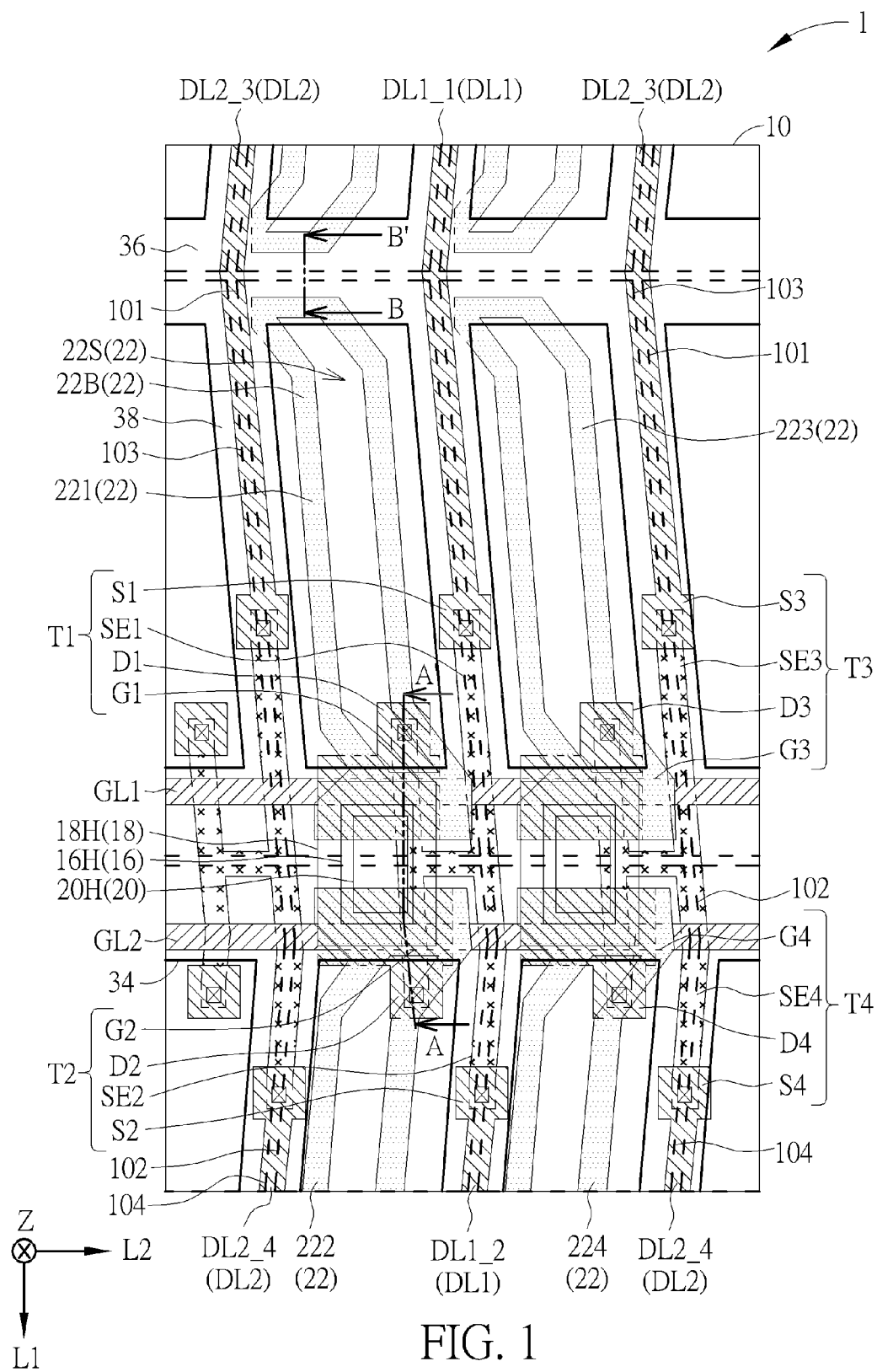
FIG. 1 is a top view schematically illustrating a pixel structure of display panel according to a first embodiment of the present invention.
Figure 2:
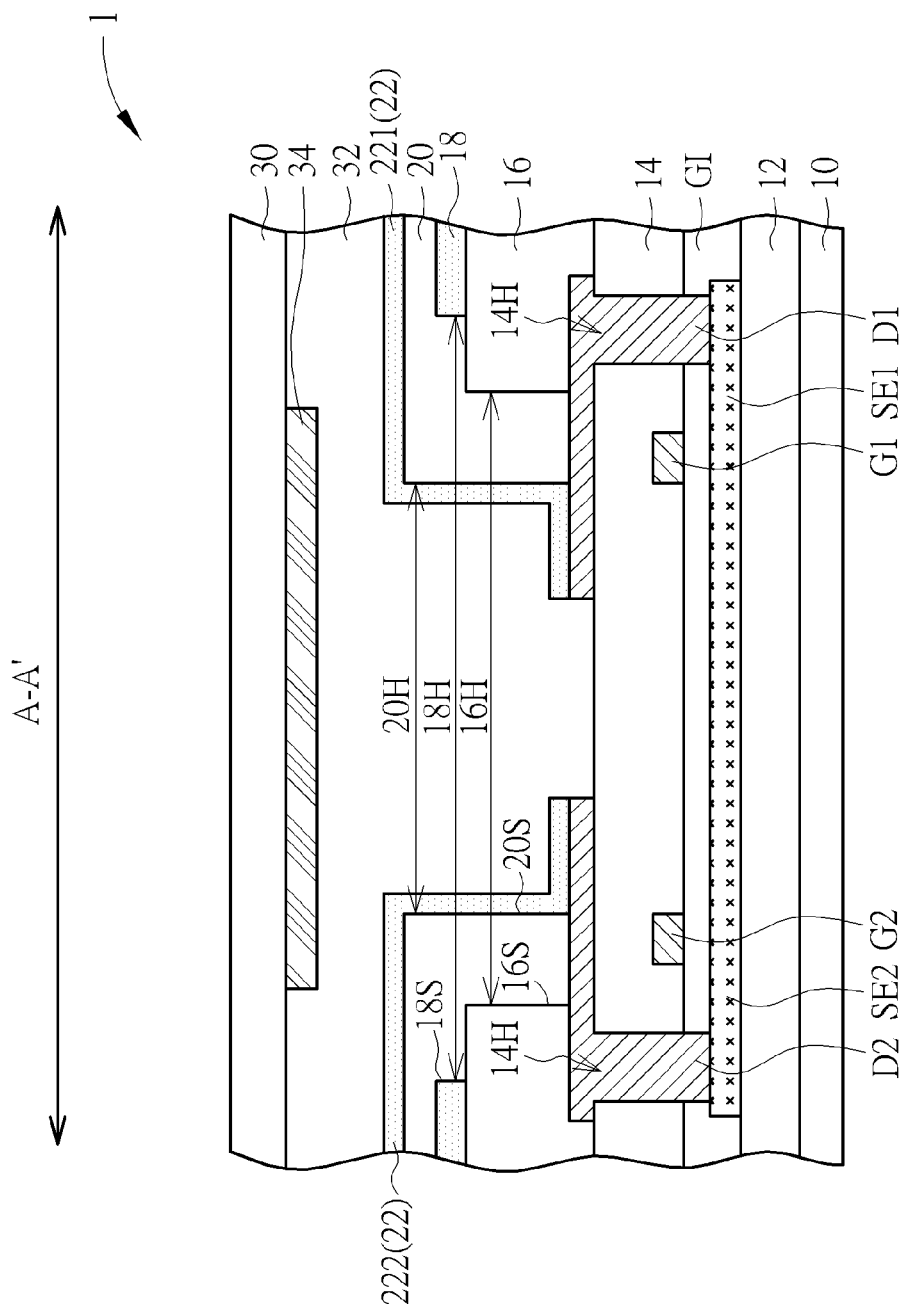
FIG. 2 is a cross-sectional view of the pixel structure of display panel taken along line A-A' of FIG. 1.
Figure 3:
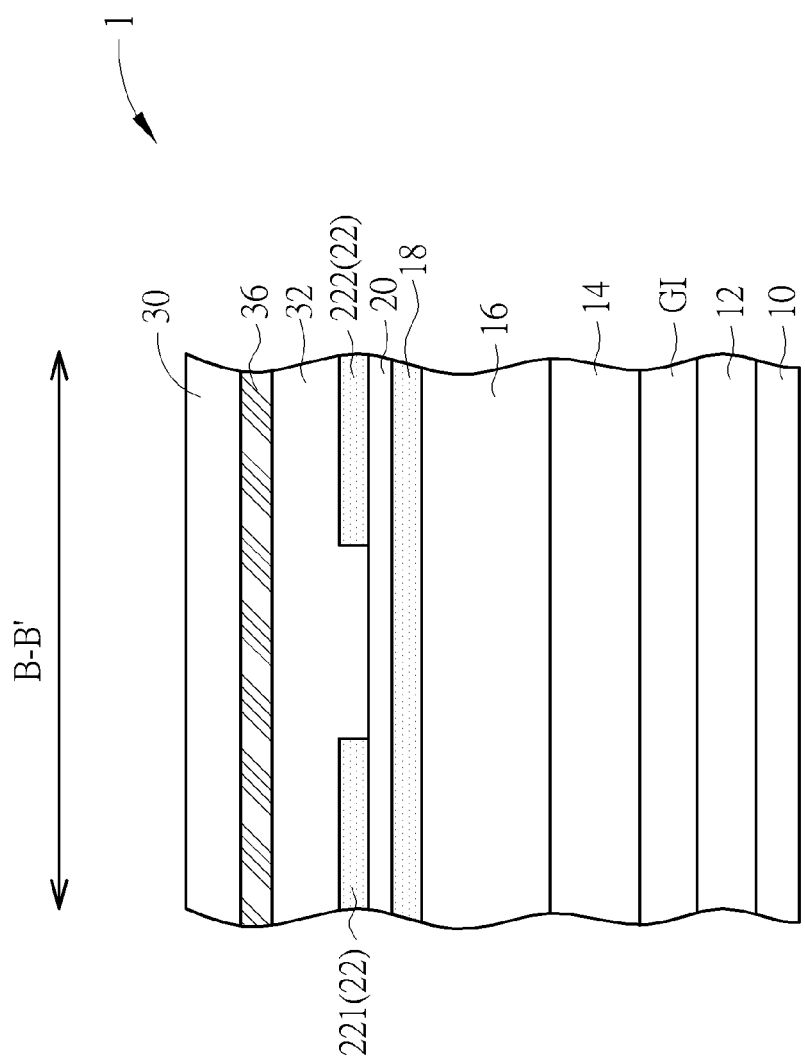
FIG. 3 is a cross-sectional view of the pixel structure of display panel taken along line B-B' of FIG. 1.

Refer to FIGS. 1-3. FIG. 1 is a top view schematically illustrating a pixel structure of display panel according to a first embodiment of the present invention, FIG. 2 is a cross-sectional view of the pixel structure of display panel taken along line A-A' of FIG. 1, and FIG. 3 is a cross-sectional view of the pixel structure of display panel taken along line B-B' of FIG. 1. In this embodiment, a pixel structure of liquid crystal display (LCD) panel is exemplarily used, where the liquid crystal display panel may be a horizontal electric field type LCD panel e.g. a fringe field switching (FFS) LCD panel or an in-plane switching (IPS) LCD panel, but not limited thereto. For example, the pixel structure of display panel may also be a pixel structure of blue phase LCD panel, or a pixel structure of any self-luminous display panel or non-self-luminous display panel. As shown in FIGS. 1-3, the pixel structure of display panel 1 includes a first substrate 10, a plurality of gate lines, data lines and thin film transistor (TFT) devices, a first passivation layer 16, a common electrode 18, a second passivation layer 20 and a plurality of pixel electrodes 22. The first substrate 10 includes a transparent substrate, which may be a rigid (firm) substrate or a flexible (bendable) substrate, such as a glass substrate, a plastic substrate or a sapphire substrate, but not limited thereto. In this embodiment, the first substrate 10 is used as an array substrate. The first substrate 10 has a plurality of first sub-pixel regions 101, second sub-pixel regions 102, third sub-pixel regions 103 and fourth sub-pixel regions 104, where four of the adjoining (adjacent) sub-pixel regions including one first sub-pixel region 101, one second sub-pixel region 102, one third sub-pixel region 103 and one fourth sub-pixel region 104 are arranged as a 2*2 pixel unit, and a plurality of pixel units are arranged as a pixel array. It is appreciated that the aforementioned pixel unit is defined by the arrangement of sub-pixel regions, which does not represents the actual composition of a pixel when displaying. Specifically, the first sub-pixel regions 101 and the second sub-pixel regions 102 are disposed adjoining and alternately in a first direction L1, and the third sub-pixel regions 103 and the fourth sub-pixel regions 104 are disposed adjoining and alternately in the first direction L1; the first sub-pixel regions 101 and the third sub-pixel regions 103 are disposed adjoining and alternately in a second direction L2, and the second sub-pixel regions 102 and the fourth sub-pixel regions 104 are disposed adjoining and alternately in the second direction L2. In this embodiment, the first direction L1 and the second direction L2 are intersecting, for example the first direction L1 and the second direction L2 are substantially perpendicular to each other, but not limited thereto. The gate lines are disposed on the first substrate 10. The gate lines include a plurality of first gate lines GL1 and second gate lines GL2, where the first gate line GL1 and the second gate line GL2 are disposed between the first sub-pixel region 101 and the second sub-pixel region 102, between the third sub-pixel region 103 and the fourth sub-pixel region 104, and extending along the second direction L2. To be exact, there are one first gate line GL1 and one second gate line GL2 between the first sub-pixel region 101 and the second sub-pixel region 102 of each pixel unit and between the third sub-pixel region 103 and the fourth sub-pixel region 104 of each pixel unit. There is no first gate line GL1 and second gate line GL2 between the first sub-pixel region 101 of each pixel unit and the second sub-pixel region 102 of another adjoining pixel unit and between the third sub-pixel region 103 of each pixel unit and the fourth sub-pixel region 104 of another adjacent pixel unit. In other words, the first sub-pixel region 101 has two adjacent second sub-pixel region 102 in the first direction L1, where the first gate line GL1 and the second gate line GL2 are disposed between the first sub-pixel region 101 and one of the two adjacent second sub-pixel regions 102, and no first gate line GL1 and no second gate line GL2 are disposed between the first sub-pixel region 101 and the other one of the two adjacent second sub-pixel regions 102. In addition, the first gate line GL1 is disposed adjoining to the first sub-pixel region 101 and the third sub-pixel region 103, and the second gate line GL2 is disposed adjoining to the second sub-pixel region 102 and the fourth sub-pixel region 104. Specifically, the first gate line GL1 is disposed between the first sub-pixel region 101 and the second gate line GL2 as well as between the third sub-pixel region 103 and the second gate line GL2, while the second gate line GL2 is disposed between the second sub-pixel region 102 and the first gate line GL1 as well as between the fourth sub-pixel region 104 and the first gate line GL1.

The TFT devices are disposed on the first substrate 10, and the TFT devices include, for instance, a first TFT device T1, a second TFT device T2, a third TFT device T3 and a fourth TFT device T4. The first TFT device T1 includes a first semiconductor channel layer SE1, a first gate electrode G1, a first source electrode S1 and a first drain electrode D1, where the first gate electrode G1 is electrically connected to the first gate line GL1, the first gate electrode G1 partially overlaps the first semiconductor channel layer SE1, and the first source electrode S1 and the first drain electrode D1 are electrically connected to the first semiconductor channel layer respectively. The second TFT device T2 includes a second semiconductor channel layer SE2, a second gate electrode G2, a second source electrode S2 and a second drain electrode D2, where the second gate electrode G2 is electrically connected to the second gate line GL2, the second gate electrode G2 partially overlaps the second semiconductor channel layer SE2, and the second source electrode S2 and the second drain electrode D2 are electrically connected to the second semiconductor channel layer SE2 respectively. The third TFT device T3 includes a third semiconductor channel layer SE3, a third gate electrode G3, a third source electrode S3 and a third drain electrode D3, where the third gate electrode G3 is electrically connected to the first gate line GL1, the third gate electrode G3 partially overlaps the third semiconductor channel layer SE3, and the third source electrode S3 and the third drain electrode D3 are electrically connected to the third semiconductor channel layer SE3 respectively. The fourth TFT device T4 includes a fourth semiconductor channel layer SE4, a fourth gate electrode G4, a fourth source electrode S4 and a fourth drain electrode D4, where the fourth gate electrode G4 is electrically connected to the second gate line GL2, the fourth gate electrode G4 partially overlaps the fourth semiconductor channel layer SE4, and the fourth source electrode S4 and the fourth drain electrode D4 are electrically connected to the fourth semiconductor channel layer SE4 respectively.

In this embodiment, the first semiconductor channel layer SE1 and the second semiconductor channel layer SE2 are structurally connected to each other, i.e. the first semiconductor channel layer SE1 and the second semiconductor channel layer SE2 belong to the same structurally-connected pattern. The third semiconductor channel layer SE3 and the fourth semiconductor channel layer SE4 are structurally connected to each other, i.e. the third semiconductor channel layer SE3 and the fourth semiconductor channel layer SE4 belong to the same structurally-connected pattern. In addition, the first semiconductor channel layer SE1 and the second semiconductor channel layer SE2 are structurally disconnected from the third semiconductor channel layer SE3 and the fourth semiconductor channel layer SE4. For example, when viewed from the vertical projection direction Z, the first semiconductor channel layer SE1 and the second semiconductor channel layer SE2 are structurally connected to each other, and the first semiconductor channel layer SE1 and the second semiconductor channel layer SE2 are substantially connected as an "H" shape (or an H-like shape) on the first substrate 30, and the third semiconductor channel layer SE3 and the fourth semiconductor channel layer SE4 are structurally connected to each other, and the third semiconductor channel layer SE3 and the fourth semiconductor channel layer SE4 are substantially connected as an "H" shape (or an H-like shape) on the first substrate 30, but not limited thereto. Each of the first semiconductor channel layer SE1, the second semiconductor channel layer SE2, the third semiconductor channel layer SE3 or the fourth semiconductor channel layer SE4 is substantially a "U" shape (or a U-like shape), where the first semiconductor channel layer SE1 and the second semiconductor channel layer SE2 are connected as an "H" shape (or an H-like shape), and the third semiconductor channel layer SE3 and the fourth semiconductor channel layer SE4 are connected as an "H" shape (or an H-like shape). In a comparative embodiment, when the first semiconductor channel layer SE1, the second semiconductor channel layer SE2, the third semiconductor channel layer SE3 or the fourth semiconductor channel layer SE4 are four structurally disconnected patterns, a certain spacing must be maintained between any two adjacent semiconductor channel layers because photolithographic process limit and design rule must be considered. Compared with the comparative embodiment, since the first semiconductor channel layer SE1 and the second semiconductor channel layer SE2 are structurally connected to each other and the third semiconductor channel layer SE3 and the fourth semiconductor channel layer SE4 are structurally connected to each other in this embodiment, the layout area can be reduced, and the aperture ratio of the pixel structure of display panel 1 can therefore be increased. In other words, since the spacing between two adjoining semiconductor channel layers can be reduced, the area of shielding region of the TFT devices can be diminished as well. Consequently, the aperture ratio of the pixel structure of display panel 1 is increased.

The data lines include a first data line DL1 and a second data line DL2, where the first data line DL1 is disposed at one side of the first sub-pixel region 101 and the second sub-pixel region 102 (e.g. the right side of the first sub-pixel region 101 and the second sub-pixel region 102 in FIG. 1) and extending along the first direction L1, and the first source electrode S1 and the second source electrode S2 are electrically connected to the first data line DL1; the second data line DL2 is disposed at one side of the third sub-pixel region 103 and the fourth sub-pixel region 104 (e.g. the right side of the third sub-pixel region 103 and the fourth sub-pixel region 104 in FIG. 1) and extending along the first direction L1, and the third source electrode S3 and the fourth source electrode S4 are electrically connected to the second data line DL2. In this embodiment, the first data line DL1 includes a first data segment (namely first data section) DL1_1 and a second data segment (namely second data section) DL1_2, and the first data segment DL1_1 and the second data segment DL1_2 are electrically connected through the first semiconductor channel layer SE1 and the second semiconductor channel layer SE2; the second data line DL2 includes a third data segment (namely third data section) DL2_3 and a fourth data segment (namely fourth data section) DL2_4, and the third data segment DL2_3 and the fourth data segment DL2_4 are electrically connected through the third semiconductor channel layer SE3 and the fourth semiconductor channel layer SE4. The first data segment DL1_1 and the second data segment DL1_2 are disposed in parallel and extending along the first direction L1, but not limited thereto. For example, the first data segment DL1_1 and the second data segment DL1_2 are arranged in a non-parallel manner, and the third data segment DL2_3 and the fourth data segment DL2_4 are arranged in a non-parallel manner. The first data segment DL1_1 and the third data segment DL2_3 are arranged substantially in parallel, and the second data segment DL1_2 and the fourth data segment DL2_4 are arranged substantially in parallel. By virtue of the above arrangement, each of the first sub-pixel region 101, the second sub-pixel region 102, the third sub-pixel region 103 or the fourth sub-pixel region 104 may be parallelogram, but the long axis direction of the first sub-pixel region 101 and that of the third sub-pixel region 103 are not parallel to that of the second sub-pixel region 102 and the fourth sub-pixel region 104 so as to increase viewing angle when displaying.

In this embodiment, the first semiconductor channel layer SE1, the second semiconductor channel layer SE2, the third semiconductor channel layer SE3 or the fourth semiconductor channel layer SE4 belong to the same patterned semiconductor layer, and the material is polycrystalline silicon, but not limited thereto. The material of the patterned semiconductor layer may be other semiconductor materials having different lattice orientations such as amorphous silicon, microcrystalline silicon, single crystalline silicon, or nanocrystalline silicon, oxide semiconductor material such as indium gallium zinc oxide (IGZO), or other proper semiconductor materials. In addition, a buffer layer 12 is optionally disposed between the first substrate 10 and the patterned semiconductor layer. The material of the buffer layer 12 may be various types of inorganic insulating material, organic insulating material or organic/inorganic insulating material. The buffer layer 12 may be single-layered structure or multi-layered stacking structure. The gate lines (e.g. the first gate line GL1 and the second gate line GL2) and the gate electrodes of the TFT devices (e.g. the first gate electrode G1, the second gate electrode G2, the third gate electrode G3 and the fourth gate electrode G4) are formed by the same patterned conductive layer, and the material of the patterned conductive layer may include metal, metal oxide or other proper conductive materials. A gate insulating layer GI is further disposed between the patterned semiconductor layer and the gate electrodes. The material of the gate insulating layer GI may be various types of inorganic insulating material, organic insulating material or organic/inorganic insulating material, and the gate insulating layer GI may be single-layered structure or multi-layered stacking structure. In addition, an inter-layered dielectric (ILD) layer 14 is disposed on the gate electrodes and the gate lines. The material of the ILD layer 14 may be various types of inorganic insulating material, organic insulating material or organic/inorganic insulating material, and the ILD layer 14 may be single-layered structure or multi-layered stacking structure. The ILD layer 14 and the gate insulating layer GI have a plurality of through holes 14H partially exposing the semiconductor channel layers, and the source electrode and the drain electrode of each TFT device are in contact with and electrically connected to the corresponding semiconductor channel layer through the through holes 14H.

The first passivation layer 16 is disposed on the TFT devices including the first TFT device T1, the second TFT device T2, the third TFT device T3 and the fourth TFT device T4. The first passivation layer 16 has a plurality of first openings 16H, where one of the first openings 16H partially exposes the first drain electrode D1 and partially exposes the second drain electrode D2, and another one of the first openings 16H partially exposes the third drain electrode D3 and partially exposes the fourth drain electrode D4. Specifically, two adjacent first drain electrode D1 and second drain electrode D2 are exposed by the same first opening 16H, and two adjacent third drain electrode D3 and fourth drain electrode D4 are exposed by the same first opening 16H. The material of the first passivation layer 16 may be various types of inorganic insulating material, organic insulating material or organic/inorganic insulating material, and the first passivation layer 16 may be single-layered structure or multi-layered stacking structure.

The common electrode 18 is disposed on the first passivation layer 16 and located in the first sub-pixel region 101, the second sub-pixel region 102, the third sub-pixel region 103 and the fourth sub-pixel region 104. The common electrode 18 has a plurality of second openings 18H, where one of the second openings 18H partially exposes the first drain electrode D1 and partially exposes the second drain electrode D2, and another one of the second openings 18H partially exposes the third drain electrode D3 and partially exposes the fourth drain electrode D4. Specifically, two adjacent first drain electrode D1 and second drain electrode D2 are exposed by the same second opening 18H, and two adjacent third drain electrode D3 and fourth drain electrode D4 are exposed by the same second opening 18H. In addition, each second opening 18H at least partially overlaps the corresponding first opening 16H in the vertical projection direction Z. In this embodiment, the dimension of the second opening 18H is larger than the dimension of the first opening 16H, for example the first opening 16H is fully covered by the second opening 18H when viewed from the vertical projection direction Z, but not limited thereto. The material of the common electrode 18 may include transparent conductive material e.g. indium tin oxide (ITO), indium zinc oxide (IZO) or other proper transparent conductive material. Also, the common electrode 18 is electrically connected to a common voltage.

The second passivation layer 20 is disposed on the first passivation layer 16 and covers the common electrode 18. The second passivation layer 20 has a plurality of third openings 20H, where one of the third openings 20H partially exposes the first drain electrode D1 and partially exposes the second drain electrode D2, and another one of the third openings 20H partially exposes the third drain electrode D3 and partially exposes the fourth drain electrode D4. Specifically, two adjacent first drain electrode D1 and second drain electrode D2 are exposed by the same third opening 20H, and two adjacent third drain electrode D3 and fourth drain electrode D4 are exposed by the same third opening 20H. In addition, each third opening 20H at least partially overlaps the corresponding first opening 16H and the corresponding second opening 18H in the vertical projection direction Z. In this embodiment, the dimension of the third opening 20H is smaller than the dimension of the first opening 16H, and the dimension of the third opening 20H is smaller than the dimension of the second opening 18H. For example, the third opening 20H is fully covered by the first opening 16H and the second opening 18H when viewed from the vertical projection direction Z, but not limited thereto. The first opening 16H, the second opening 18H and the third opening 20H are all substantially rectangular openings, but not limited thereto. The length in the first direction L1 of the first opening 16H is e.g. about 10 micrometers, and the width in the second direction L2 of the first opening 16H is e.g. about 6 micrometers, but not limited thereto. The length in the first direction L1 of the second opening 18H is e.g. about 14 micrometers, and the width in the second direction L2 of the second opening 18H is e.g. about 10 micrometers, but not limited thereto. The length in the first direction L1 of the third opening 20H is e.g. about 8 micrometers, and the width in the second direction L2 of the third opening 20H is e.g. about 4 micrometers, but not limited thereto. Furthermore, a portion of the second opening 18H is filled with the second passivation layer 20 and a part of a sidewall 18S of the common electrode 18 is covered by the second passivation layer 20, and a portion of the first opening 16H is filled with the second passivation layer 20 and a part of a sidewall 16S of the first passivation layer 16 is covered by the second passivation layer 20.

The pixel electrodes 22 are disposed on the second passivation layer 20, each pixel electrode 22 is a patterned electrode including a plurality of branch electrodes 22B, and two adjacent branch electrodes 22B are spaced with a slit 22S. The pixel electrodes 22 include a first pixel electrode 221, a second pixel electrode 222, a third pixel electrode 223 and a fourth pixel electrode 224 disposed in the first sub-pixel region 101, the second sub-pixel region 102, the third sub-pixel region 103 and the fourth sub-pixel region 104 respectively. The first pixel electrode 221 is in contact with and electrically connected to the first drain electrode D1 through the third opening 20H, the second opening 18H and the first opening 16H; the second pixel electrode 222 is in contact with and electrically connected to the second drain electrode D2 through the third opening 20H, the second opening 18H and the first opening 16H; the third pixel electrode 223 is in contact with and electrically connected to the third drain electrode D3 through the third opening 20H, the second opening 18H and the first opening 16H; and the fourth pixel electrode 224 is in contact with and electrically connected to the fourth drain electrode D4 through the third opening 20H, the second opening 18H and the first opening 16H. By virtue of the above arrangement, the pixel electrode 22 can be provided with the corresponding pixel voltage by the data line. Specifically, the first pixel electrode 221 and the second pixel electrode 222 fill into the same third opening 20H, where a portion of the third opening 20H is filled with the first pixel electrode 221 and a part of a sidewall 20S of the second passivation layer 20 (e.g. the upper part of the sidewall 20S of the second passivation layer 20 in FIG. 1) is covered by the first pixel electrode 221, another portion of the third opening 20H is filled with the second pixel electrode 221, and another part of the sidewall 20S of the second passivation layer 22 (e.g. the lower part of the sidewall 20S of the second passivation layer 20 in FIG. 1) is covered by the second pixel electrode 222. In addition, the first pixel electrode 221 and the second pixel electrode 222 are insulated from the common electrode 18 by the second passivation layer 20. Similarly, the third pixel electrode 223 and the fourth pixel electrode 224 fill into another third opening 20H, where a portion of the third opening 20H is filled with the third pixel electrode 223 and a part of a sidewall 20S of the second passivation layer 20 (e.g. the upper part of the sidewall 20S of the second passivation layer 20 in FIG. 1) is covered by the third pixel electrode 223, another portion of the third opening 20H is filled with the fourth pixel electrode 224, and another part of the sidewall 20S of the second passivation layer 22 (e.g. the lower part of the sidewall 20S of the second passivation layer 20 in FIG. 1) is covered by the fourth pixel electrode 224.

As shown in FIGS. 2-3, the pixel structure of display panel 1 further includes a second substrate 30, a display medium layer 32, a first light-shielding pattern 34 and a second light-shielding pattern 36. The second substrate 30 is disposed opposite to the first substrate 10. The second substrate 30 may be a transparent substrate and used as a counter substrate, which may be a rigid (firm) substrate or a flexible (bendable) substrate, such as a glass substrate, a plastic substrate or a sapphire substrate, but not limited thereto. The display medium layer 32 interposed between the first substrate 10 and the second substrate 30. In this embodiment, the display medium layer 32 is a liquid crystal layer, but not limited thereto. In addition, color filter layers (not shown) or other necessary components are disposed on the second substrate 30. Alternatively, the color filter layers are disposed on the first substrate 10. The first light-shielding pattern 34 is disposed on the second substrate 30 and corresponding to a common boundary between the first sub-pixel region 101 and the second sub-pixel region 102, and the first light-shielding pattern 34 overlaps the first opening 16H, the second opening 18H and the third opening 20H in the vertical projection direction Z. Additionally, the first light-shielding pattern 34 is corresponding to a common boundary between the third sub-pixel region 103 and the fourth sub-pixel region 104, and the first light-shielding pattern 34 overlaps the first opening 16H, the second opening 18H and the third opening 20H in the vertical projection direction Z. The second light-shielding pattern 36 is disposed on the second substrate 30, where the second light-shielding pattern 36 is disposed corresponding to one side of the first sub-pixel region 101 away from the second sub-pixel region 102, and corresponding to one side of the third sub-pixel region 103 away from the fourth sub-pixel region 104. In other words, the first light-shielding pattern 34 and the second light-shielding pattern 36 are both substantially rectangular patterns extending along the second direction L2. The first light-shielding pattern 34 is disposed corresponding to the common boundary between the first sub-pixel region 101 and the second sub-pixel region 102 of each pixel unit and corresponding to the common boundary between the third sub-pixel region 103 and the fourth sub-pixel region 104 of each pixel unit, i.e. the first light-shielding pattern 34 is disposed corresponding to the region where the first gate line GL1 and the second gate line GL2 are located. The second light-shielding pattern 36 is disposed corresponding to the common boundary between the first sub-pixel region 101 of each pixel unit and the second sub-pixel region 102 of another adjoining pixel unit and corresponding to the common boundary between the third sub-pixel region 103 of each pixel unit and the fourth sub-pixel region 104 of another adjoining pixel unit, i.e. the second light-shielding pattern 36 is disposed corresponding to the region where no first gate line GL1 and no second gate line GL2 are located. In other words, the first sub-pixel region 101 has two adjacent second sub-pixel region 102 in the first direction L1, where the first light-shielding pattern 34 is disposed between the first sub-pixel region 101 and one of the two second sub-pixel regions 102, and the second light-shielding pattern 36 is disposed between the first sub-pixel region 101 and the other one of the two second sub-pixel regions 102. In addition, a third light-shielding pattern 38 is further disposed on the second substrate 30, extending along the first direction L1 and corresponding to the first data line DL1 and the second data line DL2. The third light-shielding pattern 38 is connected to the first light-shielding pattern 34 and the second light-shielding pattern 36 to form a grid shape light-shielding pattern (normally referred to as black matrix, BM) to shield some of the components such as the gate lines, the data lines and the TFT devices, the light leakage in the common boundary between adjacent sub-pixel regions due to poor alignment of liquid crystal molecules, and to avoid color mixing between adjacent sub-pixel regions.

In this embodiment, since the first gate line GL1 and the second gate line GL2 are disposed between the first sub-pixel region 101 and the second sub-pixel region 102 of each pixel unit and between the third sub-pixel region 103 and the fourth sub-pixel region 104 of each pixel unit, and no first gate line GL1 and no second gate line GL2 are disposed between the first sub-pixel region 101 of each pixel unit and the second sub-pixel region 102 of another adjacent pixel unit and between the third sub-pixel region 103 of each pixel unit and the fourth sub-pixel region 104 of another adjacent pixel unit, the width of the second light-shielding pattern 36 in the first direction L1 is less than the width of the first light-shielding pattern 34 in the first direction L1. The first sub-pixel region 101 has two adjacent second sub-pixel regions 102 in the first direction L1. The first light-shielding pattern 34 is disposed between the first sub-pixel region 101 and one of the two adjacent second sub-pixel region 102, and the first light-shielding pattern 34 must overlap the first gate line GL1 and the second gate line GL2 in the vertical projection direction Z. No gate lines are disposed between the first sub-pixel region 101 and the other one of the two adjacent second sub-pixel regions 102, and thus the width of the second light-shielding pattern 36 is not restricted. Thus, the width of the first light-shielding pattern 34 is larger than the width of the second light-shielding pattern 36. For example, the width of the second light-shielding pattern 36 in the first direction L1 is approximately half the width of the first light-shielding pattern 34 in the first direction L1. In this embodiment, the width of the second light-shielding pattern 36 in the first direction L1 is approximately 8 micrometers, the width of the first light-shielding pattern 34 in the first direction L1 is approximately 16 micrometers, and the width of the third light-shielding pattern 38 in the second direction L2 is approximately between 3 micrometers and 5 micrometers, but not limited thereto.

In this embodiment, the TFT devices of two adjoining sub-pixel regions are disposed adjacently, and thus the two pixel electrodes of the two adjoining sub-pixel regions can share the same opening (contact hole) to electrically connect the drain electrodes of the corresponding TFT devices respectively. Consequently, the number of openings can be reduced to half of the original number of openings. In addition, the width of the second light-shielding pattern 36 disposed on the second substrate 30 can be diminished so that the overall aperture ratio of the pixel structure of display panel 1 is effectively increased. The experiment result shows that for pixel structures having full high definition (FHD) resolution under the same design rule, the overall aperture ratio of the pixel structure of display panel 1 of this embodiment is increased by about 5% or more as opposed to that of a pixel structure of display panel of a comparative embodiment in which the pixel electrodes are electrically connected to the drain electrodes of the TFT devices through different openings. In addition, since the first semiconductor channel layer SE1 and the second semiconductor channel layer SE2 are connected and the third semiconductor channel layer SE3 and the fourth semiconductor channel layer SE4 are connected, the aperture ratio of the pixel structure of display panel 1 can be further improved.

Figure 4:
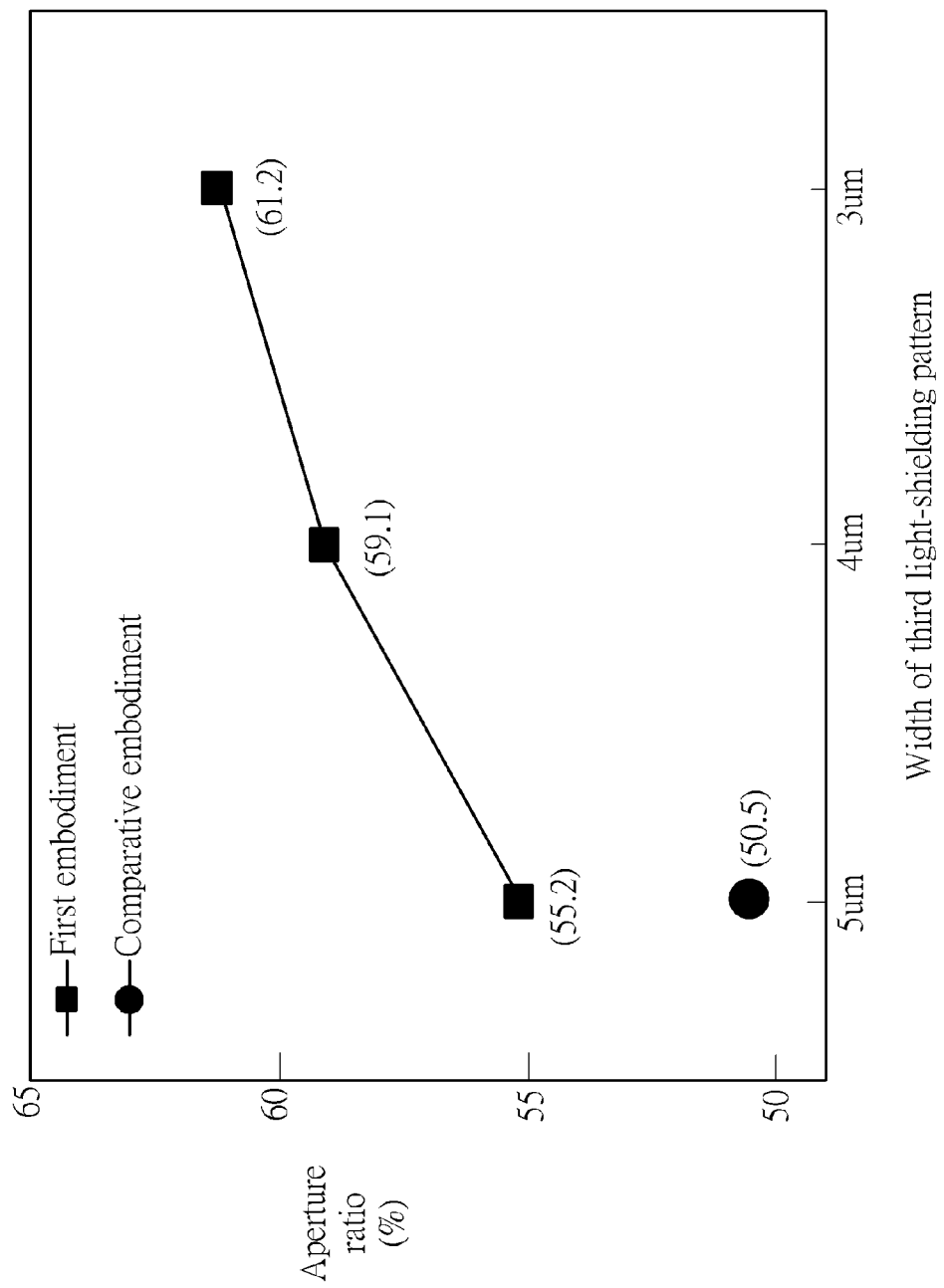
FIG. 4 depicts a simulation result of aperture ratio of the pixel structure of display panel of the first embodiment and that of the comparative embodiment.

Refer to FIG. 4, as well as FIGS. 1-3. FIG. 4 depicts a simulation result of aperture ratio of the pixel structure of display panel of the first embodiment and that of the comparative embodiment. In the pixel structure of display panel of the comparative embodiment, the pixel electrodes are electrically connected to the drain electrodes of the TFT devices through different openings, and the semiconductor channel layer is L-shaped; in the pixel structure of display panel of the first embodiment, the pixel electrodes of two adjoining sub-pixel regions share the same opening (contact hole) to electrically connect the drain electrodes of the corresponding TFT devices respectively, and the semiconductor channel layer has an H shape (or H-like shape). As shown in FIG. 4, when the width of the third light-shielding pattern 38 (i.e. the light-shielding pattern corresponding to the data line) is 5 micrometers and other conditions are identical, the simulation result shows that the aperture ratio of the pixel structure of display panel of the comparative embodiment is about 50.5%, while the aperture ratio of the pixel structure of display panel of the first embodiment is about 55.2%. If the width of the third light-shielding pattern 38 (i.e. the light-shielding pattern corresponding to the data line) is reduced to 4 micrometers or 3 micrometers, the aperture ratio of the pixel structure of display panel of the first embodiment is increased to about 59.1% or 61.2%.

The pixel structure of display panel is not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 5:
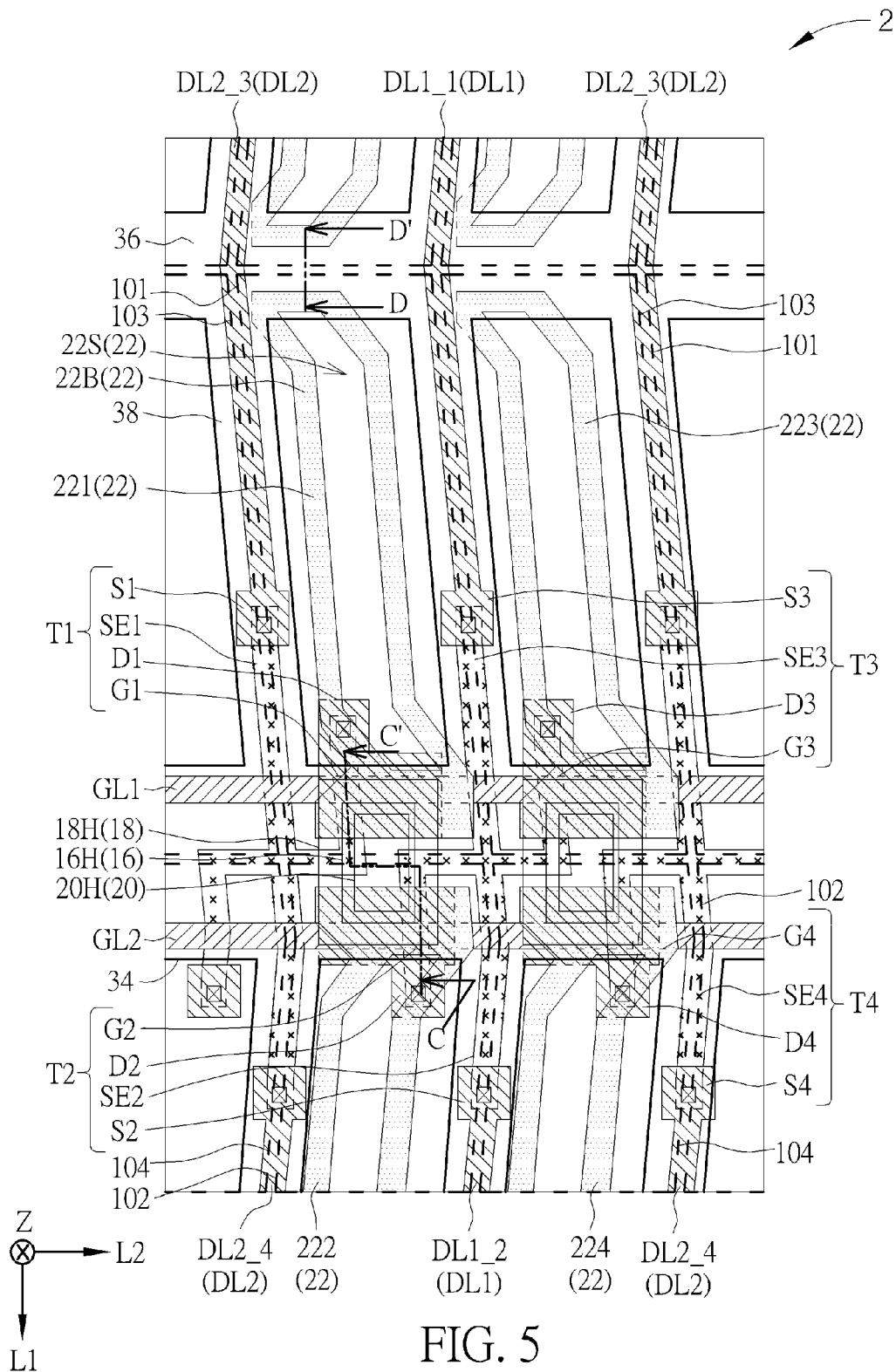
FIG. 5 is a top view schematically illustrating a pixel structure of display panel according to a second embodiment of the present invention.
Figure 6:
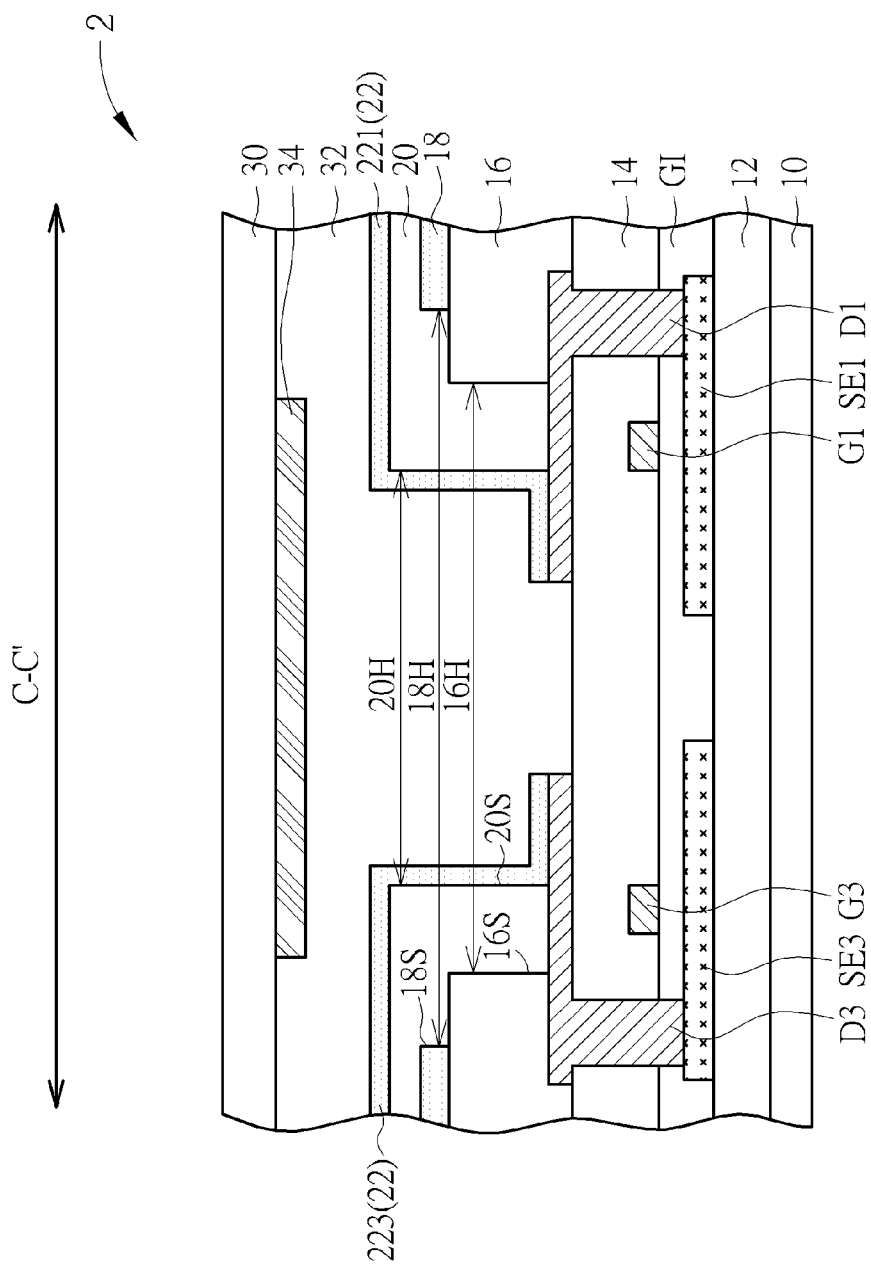
FIG. 6 is a cross-sectional view of the pixel structure of display panel taken along line C-C' of FIG. 5.
Figure 7:
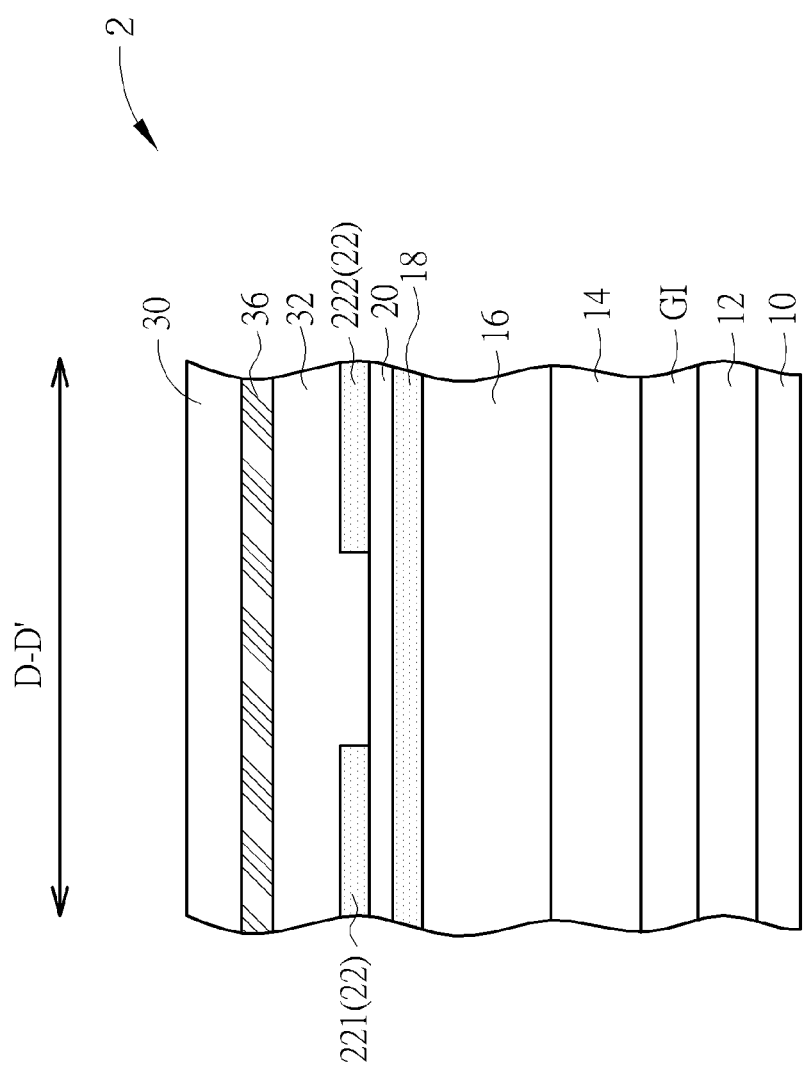
FIG. 7 is a cross-sectional view of the pixel structure of display panel taken along line D-D' of FIG. 5.

Refer to FIGS. 5-7. FIG. 5 is a top view schematically illustrating a pixel structure of display panel according to a second embodiment of the present invention, FIG. 6 is a cross-sectional view of the pixel structure of display panel taken along line C-C' of FIG. 5, and FIG. 7 is a cross-sectional view of the pixel structure of display panel taken along line D-D' of FIG. 5. As shown in FIGS. 5-7, different from the pixel structure of display panel of the first embodiment, in the pixel structure of display panel 2 of this embodiment, the second semiconductor channel layer SE2 and the third semiconductor channel layer SE3 are structurally connected to each other, i.e. the second semiconductor channel layer SE2 and the third semiconductor channel layer SE3 belong to the same structurally-connected pattern; the first semiconductor channel layer SE1 and the fourth semiconductor channel layer SE4 are structurally connected to each other, i.e. the first semiconductor channel layer SE1 and the fourth semiconductor channel layer SE4 belong to the same structurally-connected pattern. The first semiconductor channel layer SE1 and the fourth semiconductor channel layer SE4 are structurally disconnected from the second semiconductor channel layer SE2 and the third semiconductor channel layer SE3. For example, each of the first semiconductor channel layer SE1, the second semiconductor channel layer SE2, the third semiconductor channel layer SE3 or the fourth semiconductor channel layer SE4 is substantially a "U" shape (or a U-like shape), where the second semiconductor channel layer SE2 and the third semiconductor channel layer SE3 are connected as a swastika shape ("卍") (or a cruciform-like shape), and the first semiconductor channel layer SE1 and the fourth semiconductor channel layer SE4 are connected as a swastika shape ("卐") (or a cruciform-like shape), but not limited thereto.

Similar to the first embodiment, in the pixel structure of display panel 2 of this embodiment, the first pixel electrode 221 and the second pixel electrode 222 fill into the same third opening 20H, where a portion of the third opening 20H is filled with the first pixel electrode 221 and a part of a sidewall 20S of the second passivation layer 20 (e.g. the upper part of the sidewall 20S of the second passivation layer 20 in FIG. 5) is covered by the first pixel electrode 221, another portion of the third opening 20H is filled with the second pixel electrode 221, and another part of the sidewall 20S of the second passivation layer 22 (e.g. the lower part of the sidewall 20S of the second passivation layer 20 in FIG. 5) is covered by the second pixel electrode 222. In addition, the first pixel electrode 221 and the second pixel electrode 222 are insulated from the common electrode 18 by the second passivation layer 20. Similarly, the third pixel electrode 223 and the fourth pixel electrode 224 fill into another third opening 20H, where a portion of the third opening 20H is filled with the third pixel electrode 223 and a part of a sidewall 20S of the second passivation layer 20 (e.g. the upper part of the sidewall 20S of the second passivation layer 20 in FIG. 5) is covered by the third pixel electrode 223, another portion of the third opening 20H is filled with the fourth pixel electrode 224, and another part of the sidewall 20S of the second passivation layer 22 (e.g. the lower part of the sidewall 20S of the second passivation layer 20 in FIG. 5) is covered by the fourth pixel electrode 224.

Figure 8:
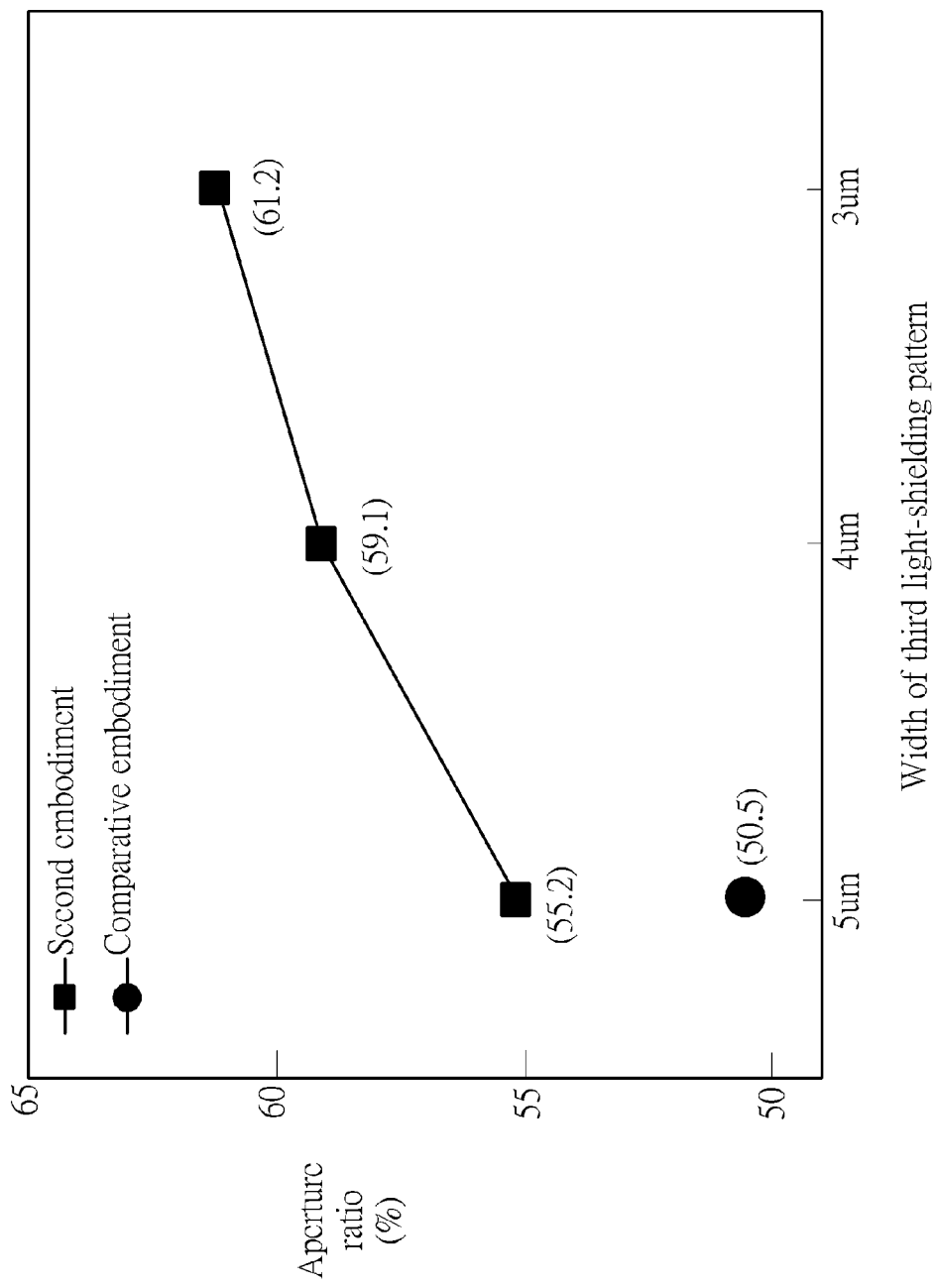
FIG. 8 depicts a simulation result of aperture ratio of the pixel structure of display panel of the second embodiment and that of the comparative embodiment.

Refer to FIG. 8, as well as FIGS. 5-7. FIG. 8 depicts a simulation result of aperture ratio of the pixel structure of display panel of the second embodiment and that of the comparative embodiment. In the pixel structure of display panel of the comparative embodiment, the pixel electrodes are electrically connected to the drain electrodes of the TFT devices through different openings, and the semiconductor channel layer is L-shaped; in the pixel structure of display panel of the first embodiment, the pixel electrodes of two adjoining sub-pixel regions share the same opening (contact hole) to electrically connect the drain electrodes of the corresponding TFT devices respectively, and the semiconductor channel layer has swastika shape (or a cruciform-like shape). As shown in FIG. 8, when the width of the third light-shielding pattern 38 (i.e. the light-shielding pattern corresponding to the data line) is 5 micrometers and other conditions are identical, the simulation result shows that the aperture ratio of the pixel structure of display panel of the comparative embodiment is about 50.5%, while the aperture ratio of the pixel structure of display panel of the first embodiment is about 55.2%. If the width of the third light-shielding pattern 38 (i.e.

the light-shielding pattern corresponding to the data line) is reduced to 4 micrometers or 3 micrometers, the aperture ratio of the pixel structure of display panel of the first embodiment is increased to about 59.1% or 61.2%.

In conclusion, the TFT devices of two adjoining sub-pixel regions are disposed adjacently, and thus the two pixel electrodes of the two adjoining sub-pixel regions can share the same opening (contact hole) to electrically connect the drain electrodes of the corresponding TFT devices respectively. Consequently, the number of openings can be reduced to half of the original number of openings. In addition, the width of the light-shielding pattern disposed on the second substrate can be diminished so that the overall aperture ratio of the pixel structure of display panel is effectively increased. In addition, since the semiconductor channel layers of two adjoining sub-pixel regions are connected, the aperture ratio of the pixel structure of display panel can be further improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel structure of display panel, comprising:
   a first substrate having a first sub-pixel region and a second sub-pixel region, wherein the first sub-pixel region and the second sub-pixel region are disposed adjoining in a first direction;
   a first gate line disposed between the first sub-pixel region and the second sub-pixel region and extending along a second direction;
   a second gate line disposed between the first sub-pixel region and the second sub-pixel region and extending along the second direction;
   a first thin film transistor device disposed on the first substrate, wherein the first thin film transistor device comprises a first semiconductor channel layer, a first gate electrode, a first source electrode and a first drain electrode, the first gate electrode is electrically connected to the first gate line, the first gate electrode partially overlaps the first semiconductor channel layer, and the first source electrode and the first drain electrode are electrically connected to the first semiconductor channel layer respectively;
   a second thin film transistor device disposed on the first substrate, wherein the second thin film transistor device comprises a second semiconductor channel layer, a second gate electrode, a second source electrode and a second drain electrode, the second gate electrode is electrically connected to the second gate line, the second gate electrode partially overlaps the second semiconductor channel layer, and the second source electrode and the second drain electrode are electrically connected to the second semiconductor channel layer respectively;
   a first passivation layer disposed on the first thin film transistor device and the second thin film transistor device, wherein the first passivation layer has a first opening partially exposing the first drain electrode and the second drain electrode;
   a common electrode disposed on the first passivation layer, wherein the common electrode has a second opening partially exposing the first drain electrode and the second drain electrode, and the second opening at least partially overlaps the first opening in a vertical projection direction;
   a second passivation layer disposed on the first passivation layer and covering the common electrode, wherein the second passivation layer has a third opening partially exposing the first drain electrode and the second drain electrode, and the third opening at least partially overlaps the first opening and the second opening in the vertical projection direction;
   a first pixel electrode disposed on the second passivation layer, wherein the first pixel electrode is electrically connected to the first drain electrode through the third opening, the second opening and the first opening; and
   a second pixel electrode disposed on the second passivation layer, wherein the second pixel electrode is electrically connected to the second drain electrode through the third opening, the second opening and the first opening.

2. The pixel structure of display panel of claim 1, wherein a dimension of the second opening is larger than a dimension of the first opening.

3. The pixel structure of display panel of claim 2, wherein a dimension of the third opening is smaller than the dimension of the first opening, the dimension of the third opening is smaller than the dimension of the second opening, a portion of the second opening is filled with the second passivation layer and a part of a sidewall of the common electrode is covered by the second passivation layer, and a portion of the first opening is filled with the second passivation layer and a part of a sidewall of the first passivation layer is covered by the second passivation layer.

4. The pixel structure of display panel of claim 1, wherein a portion of the third opening is filled with the first pixel electrode and a part of a sidewall of the second passivation layer is covered by the first pixel electrode, another portion of the third opening is filled with the second pixel electrode, and another part of the sidewall of the second passivation layer is covered by the second pixel electrode.

5. The pixel structure of display panel of claim 1, wherein the first semiconductor channel layer and the second semiconductor channel layer are structurally connected to each other.

6. The pixel structure of display panel of claim 4, further comprising a first data line disposed at one side of the first sub-pixel region and the second sub-pixel region and extending along the first direction, wherein the first source electrode and the second source electrode are electrically connected to the first data line.

7. The pixel structure of display panel of claim 6, wherein the first data line comprises a first data segment and a second data segment, and the first data segment and the second data segment are electrically connected through the first semiconductor channel layer and the second semiconductor channel layer.

8. The pixel structure of display panel of claim 1, wherein the first semiconductor channel layer and the second semiconductor channel layer are structurally disconnected from each other.

9. The pixel structure of display panel of claim 8, further comprising a first data line disposed at one side of the first sub-pixel region and the second sub-pixel region and extending along the first direction, and a second data line disposed at the other side of the first sub-pixel region and the second sub-pixel region and extending along the first direction, wherein the first source electrode is electrically connected to the first data line and the second source electrode is electrically connected to the second data line.

10. The pixel structure of display panel of claim 9, wherein the first substrate further has a third sub-pixel region disposed adjoining to the first sub-pixel region in the second direction, the second data line is disposed between the first sub-pixel region and the third sub-pixel region, and the pixel structure of display panel further comprises:
- a third thin film transistor device disposed on the first substrate, wherein the third thin film transistor device comprises a third semiconductor channel layer, a third gate electrode, a third source electrode and a third drain electrode, the third gate electrode partially overlaps the third semiconductor channel layer, the third source electrode and the third drain electrode are electrically connected to the third semiconductor channel layer respectively, and the third source electrode is electrically connected to the second data line; and
- a third pixel electrode disposed on the second passivation layer and electrically connected to the third drain electrode.

11. The pixel structure of display panel of claim 10, wherein the second semiconductor channel layer and the third semiconductor channel layer are structurally connected to each other.

12. The pixel structure of display panel of claim 11, wherein the second data line comprises a third data segment and a fourth data segment, and the third data segment and the fourth data segment are electrically connected through the second semiconductor channel layer and the third semiconductor channel layer.

13. The pixel structure of display panel of claim 1, further comprising:
- a second substrate disposed opposite to the first substrate; and
- a first light-shielding pattern disposed on the second substrate and corresponding to a common boundary between the first sub-pixel region and the second sub-pixel region, wherein the first light-shielding pattern overlaps the first opening, the second opening and the third opening in the vertical projection direction.

14. The pixel structure of display panel of claim 13, further comprising a second light-shielding pattern disposed on the second substrate and corresponding to one side of the first sub-pixel region away from the second sub-pixel region, wherein a width of the second light-shielding pattern in the first direction is less than a width of the first light-shielding pattern in the first direction.

15. A pixel structure of display panel, comprising:
- a first substrate having a first sub-pixel region, a second sub-pixel region and a third sub-pixel region, wherein the first sub-pixel region and the second sub-pixel region are disposed adjoining in a first direction, and the first sub-pixel region and the third sub-pixel region are disposed adjoining in a second direction;
- a first gate line disposed between the first sub-pixel region and the second sub-pixel region and extending along the second direction;
- a second gate line disposed between the first sub-pixel region and the second sub-pixel region and extending along the second direction;
- a first thin film transistor device disposed on the first substrate, wherein the first thin film transistor device comprises a first semiconductor channel layer, a first gate electrode, a first source electrode and a first drain electrode, the first gate electrode is electrically connected to the first gate line, the first gate partially overlaps the first semiconductor channel layer, and the first source electrode and the first drain electrode are electrically connected to the first semiconductor channel layer respectively;
- a second thin film transistor device disposed on the first substrate, wherein the second thin film transistor device comprises a second semiconductor channel layer, a second gate electrode, a second source electrode and a second drain electrode, the second gate electrode is electrically connected to the second gate line, the second gate electrode partially overlaps the second semiconductor channel layer, and the second source electrode and the second drain electrode are electrically connected to the second semiconductor channel layer respectively; and
- a third thin film transistor device disposed on the first substrate, wherein the third thin film transistor device comprises a third semiconductor channel layer, a third gate electrode, a third source electrode and a third drain electrode, the third gate electrode is electrically connected to the first gate line, the third gate electrode partially overlaps the third semiconductor channel layer, and the third source electrode and the third drain electrode are electrically connected to the third semiconductor channel layer respectively;
- wherein the first semiconductor channel layer and the second semiconductor channel layer are structurally connected to each other, or the second semiconductor channel layer and the third semiconductor channel layer are structurally connected to each other.

16. The pixel structure of display panel of claim 15, further comprising:
- a second substrate disposed opposite to the first substrate;
- a first-light-shielding pattern disposed on the second substrate and corresponding to a common boundary between the first sub-pixel region and the second sub-pixel region; and
- a second light-shielding pattern disposed on the second substrate, wherein the first light-shielding pattern and the second light-shielding pattern are respectively disposed corresponding to two opposite sides of the first sub-pixel region, and a width of the second light-shielding pattern in the first direction is less than a width of the first light-shielding pattern in the first direction.

17. The pixel structure of display panel of claim 15, wherein the first semiconductor channel layer and the second semiconductor channel layer are structurally connected to each other, and the first semiconductor channel layer and the second semiconductor channel layer are connected as an "H" shape on the first substrate.

18. The pixel structure of display panel of claim 15, wherein the second semiconductor channel layer and the third semiconductor channel layer are structurally connected to each other, and the second semiconductor channel layer and the third semiconductor channel layer are connected as a swastika shape on the first substrate.

* * * * *